United States Patent [19]

Pepping et al.

[11] Patent Number: 4,643,495
[45] Date of Patent: Feb. 17, 1987

[54] MECHANICAL STORAGE CABINET WITH CONTAINER CONVEYOR

[75] Inventors: Karl-Heinz Pepping, Weyer; Werner Kreuz, Wilnsdorf, both of Fed. Rep. of Germany

[73] Assignee: Electrolux Constructor GmbH, Wilnsdorf, Fed. Rep. of Germany

[21] Appl. No.: 817,788

[22] Filed: Jan. 7, 1986

Related U.S. Application Data

[63] Continuation of Ser. No. 572,219, Jan. 19, 1984, abandoned.

[30] Foreign Application Priority Data

Jan. 21, 1983 [DE] Fed. Rep. of Germany ....... 3302018
Jan. 11, 1984 [DE] Fed. Rep. of Germany ....... 3400743

[51] Int. Cl.$^4$ ............................................. A47B 49/00
[52] U.S. Cl. .................................... 312/268; 198/800; 312/266
[58] Field of Search ........................................ 198/800

[56] References Cited

U.S. PATENT DOCUMENTS

| | | | |
|---|---|---|---|
| 1,680,035 | 8/1928 | Buckingham | 312/268 |
| 2,048,641 | 7/1936 | Venzie | 52/357 |
| 2,766,417 | 10/1956 | Merritt | 474/109 |
| 2,816,000 | 12/1957 | Scholfield | 312/268 |
| 3,537,768 | 11/1970 | Anders | 312/266 |
| 3,578,832 | 5/1971 | Toms | 312/268 |
| 3,902,590 | 9/1975 | Raynor et al. | 312/268 |
| 4,354,459 | 10/1982 | Maxey | 474/109 |
| 4,362,525 | 12/1982 | Sproul | 474/117 |
| 4,476,985 | 10/1984 | Norberg et al. | 211/184 |

FOREIGN PATENT DOCUMENTS

| | | |
|---|---|---|
| 1285952 | 10/1967 | Fed. Rep. of Germany . |
| 2018905 | 12/1971 | Fed. Rep. of Germany . |
| 1886533 | 5/1972 | Fed. Rep. of Germany . |
| 2327077 | 5/1973 | Fed. Rep. of Germany ...... 312/266 |
| 2034222 | 1/1976 | Fed. Rep. of Germany . |

Primary Examiner—William F. Pate, III
Assistant Examiner—Joseph Falk
Attorney, Agent, or Firm—Balogh, Osann, Kramer, Dvorak, Genova & Traub

[57] ABSTRACT

The subject matter of the invention is a mechanical cabinet with a paternoster-like circulating conveyor comprising two endless chains (1, 2), a multiplicity of pull-out shelves (17) for receiving industrial articles, for example, and affixed with their end walls to the two endless chains (1, 2) at predetermined equal distances by way of pairs of supporting arms (7, 8), and stationary guide rails (18, 19) on the narrow sides of the cabinet composed each of two vertical sections (20) and an upper and lower arcuate section (21, 22), said rails guiding guide members (10) rigidly mounted to the end walls of the shelves (17). With such mechanical cabinets problems arise regarding safe and smooth guidance of the endless chains and the shelves, particularly when the latter are non-uniformly loaded. In order to obtain a construction resistant to warping, and for improved guidance, each guide member (10) supports two vertically spaced guide elements (11, 12), and in the vertical sections (20) of the guide rails (18, 19) both guide elements (11, 12) are guided jointly, while in the arcuate sections (21, 22) only one guide element (12) is guided. The size and arrangement of the structural parts are so adapted to each other that the shelves rest on each other during their vertical travel.

11 Claims, 10 Drawing Figures

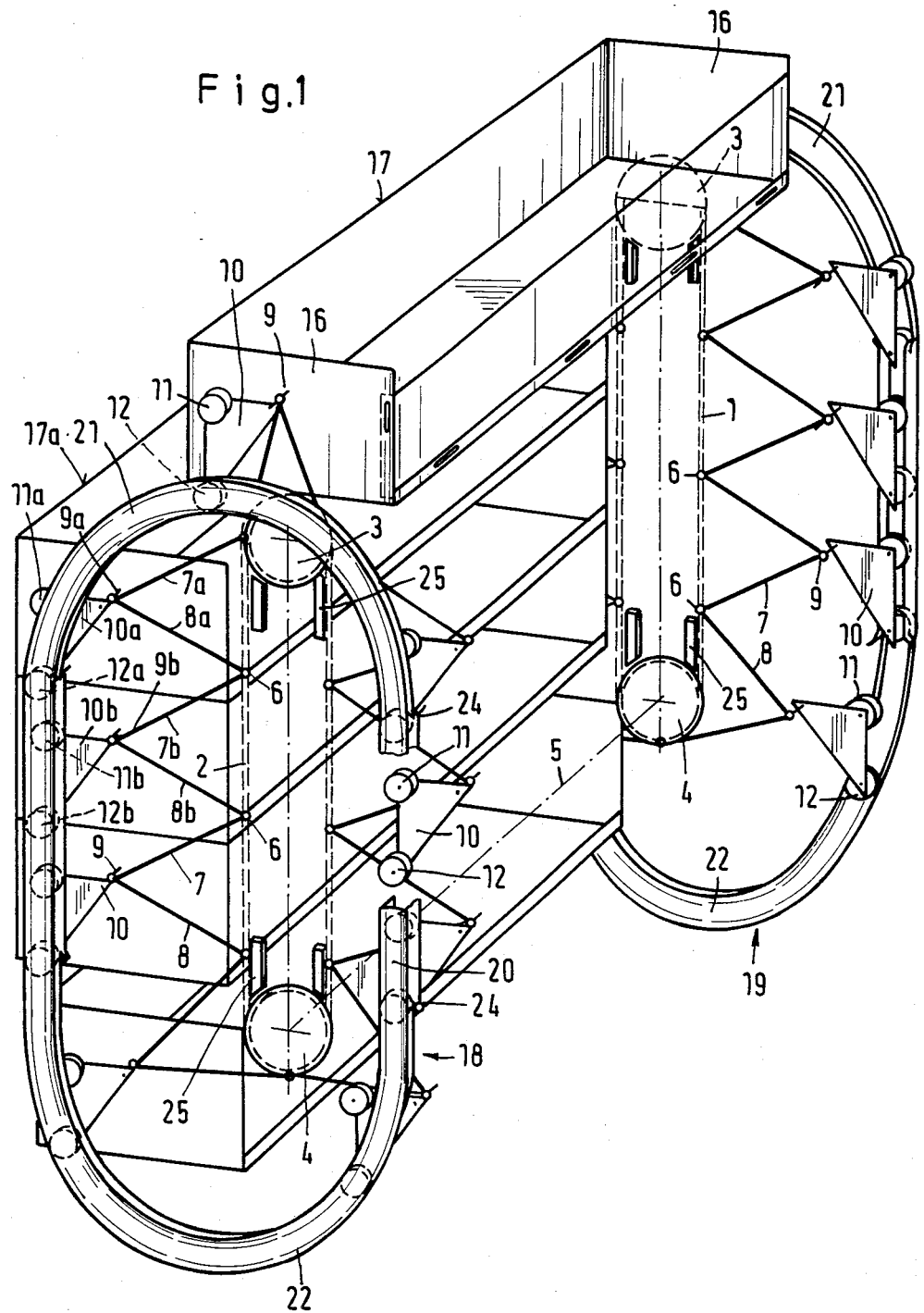

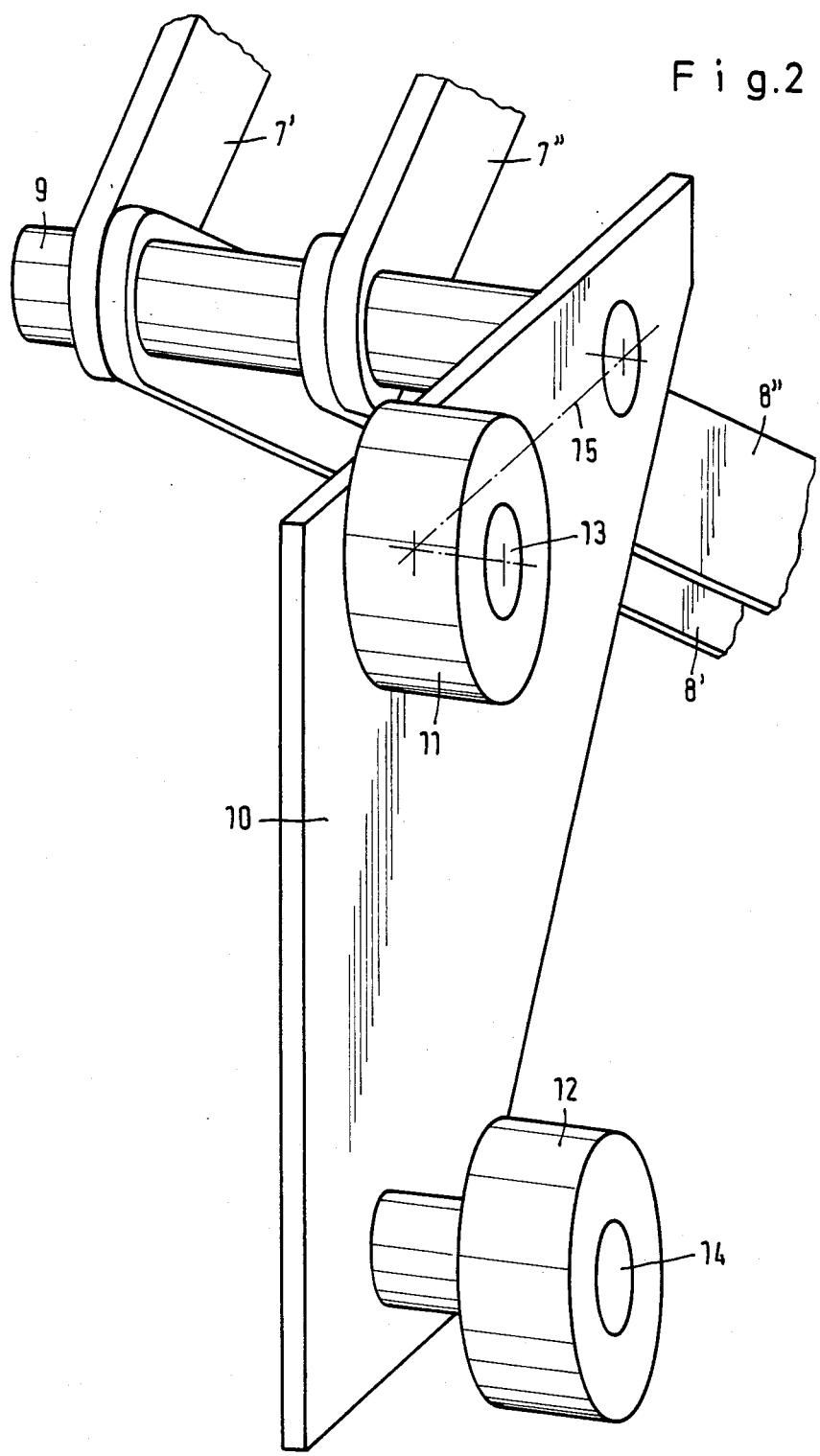

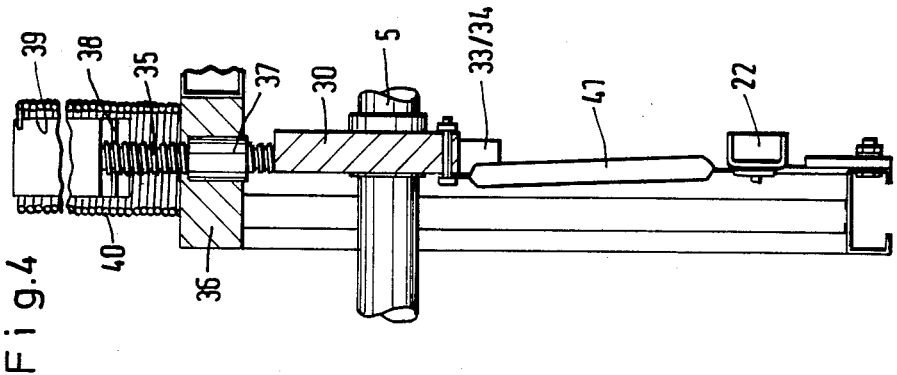
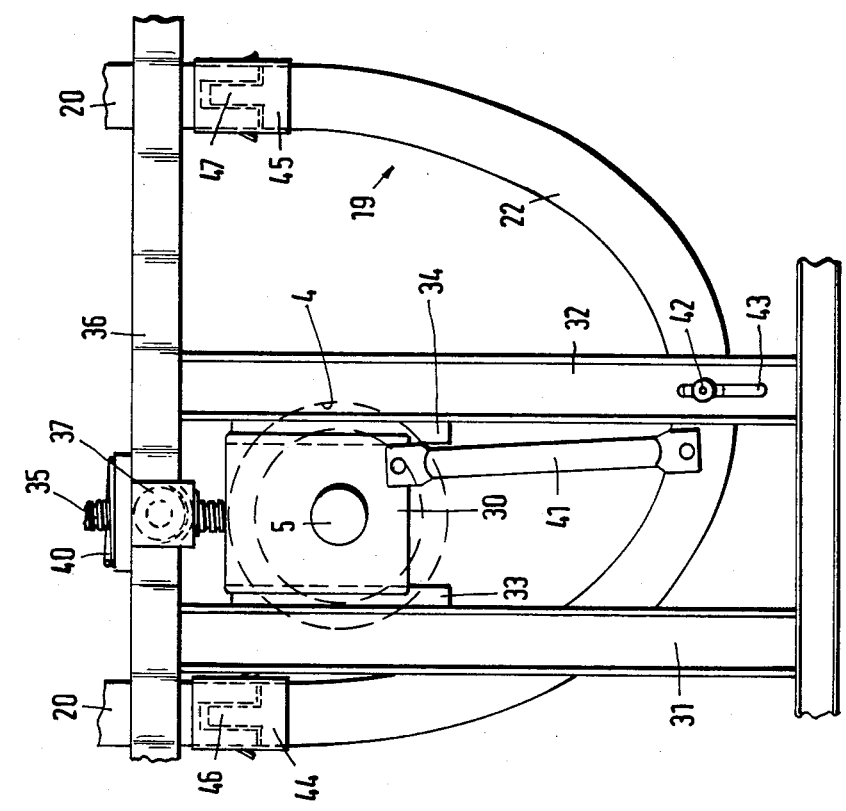

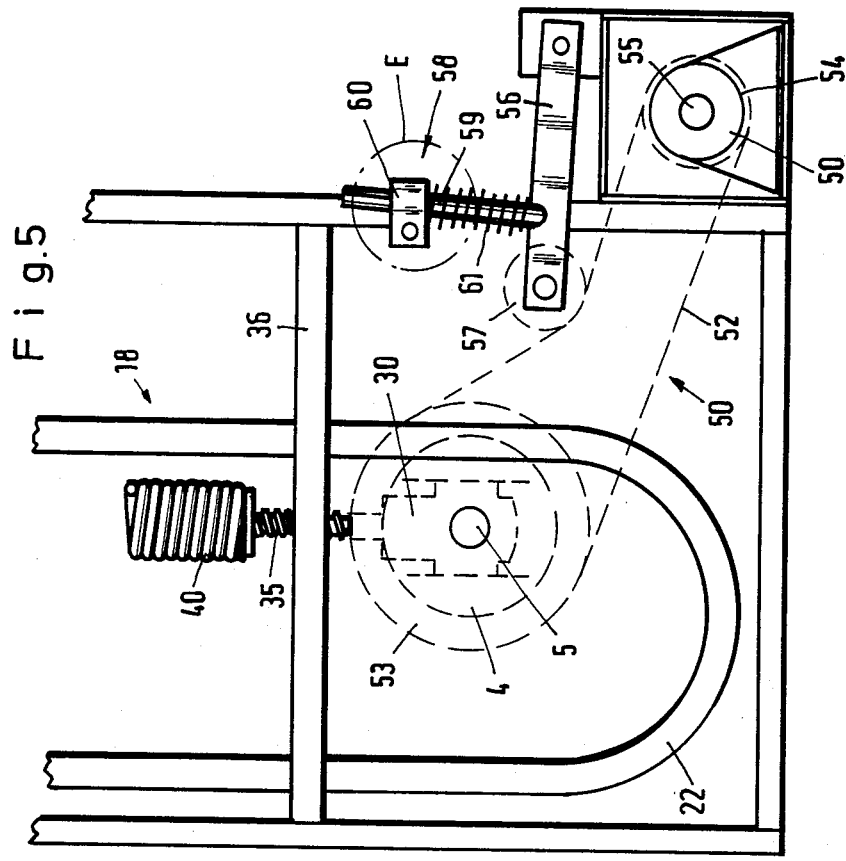
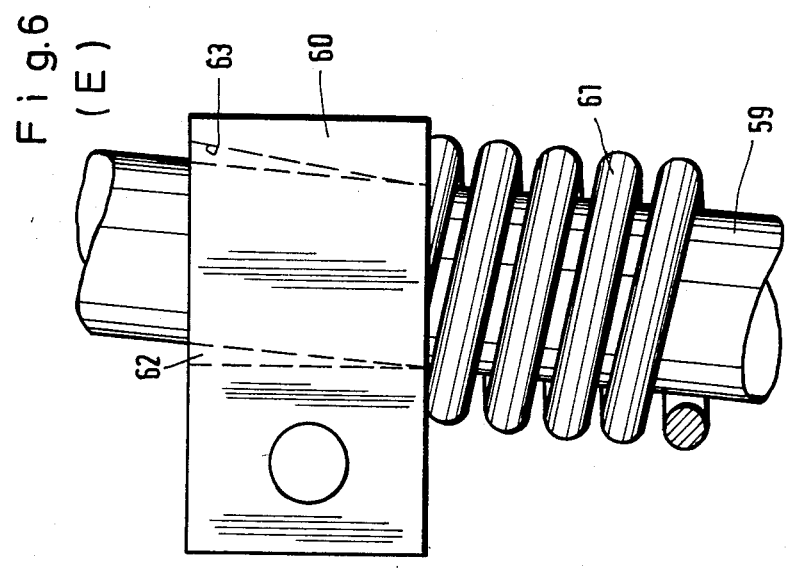

MECHANICAL STORAGE CABINET WITH CONTAINER CONVEYOR

This application is a continuation of application Ser. No. 572,219, filed Jan. 19, 1984, now abandoned.

The invention relates to a cabinet with a paternoster-like circulating conveyor comprising two endless chains, a multiplicity of pull-out shelves for receiving industrial articles, for example, said shelves being affixed with their end walls to the two endless chains at predetermined equal distances by way of pairs of supporting arms, and stationary guide rails on the narrow sides of the cabinet consisting each of two vertical sections und one upper and one lower arcuate section, said rails guiding guide members rigidly mounted to the end walls of said pull-out shelves.

In the course of economizing storage of supplies so-called mechanical cabinets have been increasingly used for several years which in the interior thereof have a vertical paternoster-like conveyor means carrying the drawers in the form of so-called Swiss or pull-out shelves. By means of manual or programmed control individual shelves can be moved by appropriate actuation of the conveyor means to confront an aperture positioned at about table level. Articles can be taken out of or put into said shelves by an operator either manually or automatically with the help of manipulators. Whereas such mechanical cabinets require substantially higher investment than storage in conventional shelves, they offer a number of advantages. A significant advantage resides in the quick and simple access to the various stored articles at equal level of the cabinet aperture. Furthermore, depending on the height of the cabinets, a large number of all sorts of articles can be stored in a relatively small space area, because extra space for moving the lifting means to and from conventional storage shelves is not required. Furthermore, such mechanical cabinets, including the program control thereof, can be integrated as intermediate storage and distributing stations in assembly and manufacturing lines.

From German Pat. No. 1,285,952 a mechanical cabinet has been known in which the pull-out shelves are suspended from two oppositely disposed vertical endless chains. To the endless chains trained over sprocket wheels supporting arms are connected which project radially outwardly with respect to the circulating direction and, with their free ends, hold the shelves. The two endless chains are laterally offset with respect to each other, and on their two narrow end walls the shelves have supporting pins positioned at the opposing corners above the center of gravity thereof and engaging the supporting arms of the accordingly offset chain strands. Owing to this construction the shelves can be arranged in closely spaced succession on the straight vertical paths and nevertheless do not contact each other in the upper and the lower circular path, without the need of additional guide means. The supporting arms have the shape of triangular plates with one chain bolt each arranged in the two corner regions of the base and with the supporting pin of the shelf arranged in the triangle tip region.

However, in practice it has become apparent that, particularly when the shelves are non-uniformly loaded, considerable forces are transmitted via the supporting arms to the—unguided—chain, which results in undesirable deflection of the respective chain strands and high and non-uniform stress on individual chain links. Particularly high moments occur in the arcuate region of the sprocket wheels which are due to centrifugal forces and may cause the entire cabinet structure to vibrate. Moreover, the shelves must have a predetermined width-to-length ratio in order that the stabilizing effect achieved by the diagonal offsetting of the supporting pins is realized in practice. However, this limits the maximum possible width of the mechanical cabinets.

German Pat. No. 2,034,222 describes a circulating conveyor means for mechnical cabinets of unlimited width in which the shelves are likewise suspended on endless chains by way of supporting pins at the end walls and by way of angularly spreading pairs of supporting arms. In order to provide the desired large cabinet width two mutually horizontally aligned short shelves each are provided whose outer supporting pins are disposed on the same axis and whose supporting pins at the facing end walls are vertically offset with respect to the two outer supporting pins and are connected to a third, central endless chain by way of an additional pair of supporting arms. In this circulating conveyor it is not considered necessary either to guide the supporting arms or the supporting pins; however, this likewise results in vibrating or tilting motions of the shelves and in high non-uniform stress on the sprocket wheels, if due to non-uniform loading the shelves have different weights and/or the center of gravity thereof is displaced as a result of eccentric loading.

German Utility Model Pat. No. 1,886,533 discloses a paternoster-like circulating conveyor for mechanical cabinets in which the supporting arms provided for pivotal connection of the shelves to the two endless chains are designed as a pair of spreading levers whose outer projecting ends are pivotally connected to each other by way of the respective supporting pin at the shelves. In order to reduce the moments occuring in the arcuate regions due to centrifugal forces affecting the shelves, and thus to attain higher stability, the length of the individual levers is to be made equal to the diameter, and the spreading of a lever pair is to be made equal to half the diameter of the return rollers. This reduction of the occurring moments attained by a parabolashaped path of movement in the transition regions, however, is not sufficient to increase the conveying speed in a desirable way. Moreover, considerable moments occur when the conveyor is started up and slowed down, which may cause the entire cabinet to vibrate or the pivotally suspended shelves to tilt. In order to increase the speed of conveyance of such circulating conveyors it has been known, for example, from German Pat. No. 2,327,077 to link the two ends of the spreading levers, in turn, to joints of one inner spreading lever each arranged at the chain, or to joints of interposed further spreading levers. This suspension of the shelves has the purpose of reducing the speed differences between the straight, vertical paths and the arcuate paths. Exact guidance of the shelves and of the individual chain strands is contemplated and possible neither in the vertical nor in the arcuate sections of the circulating paths.

In a horizontally aligned product storing system according to German Auslegeschrift No. 2,018,905, an apparatus for guiding profiled supports in horizontal position is used for travel around the sprocket wheels of two endless roller chains. These profiled supports are pivotally linked to the end faces of chain transporting links and are non-rotatively connected to an angular lever having supporting and guide rolls at its ends. During circulation about the sprocket wheels from the upper to the lower run of the endless chain these guide rolls are supported on guide bars provided outside the chain path.

Finally, a mechanical cabinet with a paternoster-like circulating conveyor for storing especially industrial articels has been known in which the shelves are suspended on two endless chains by way of spreading lever pairs pivotally engaging them in the center of gravity. In order to be able to take up the high moments occurring particularly in case of non-uniformly loaded shelves and resulting in deflecting motions of the chain strands, in this embodiment oblique guide arms having rolls at their ends are rigidly mounted to the supporting pin of the shelves and are guided in a guide path of U-shaped cross section formed by vertical and arcuate sections. In order to be able to receive the deflecting motions of the chain strands in the region of the vertical paths of movement further rolls and a further closed guide path formed by vertical sections are required. Although this embodiment is fairly well suited also for mechanical cabinets capable of carrying high loads, owing to the twin guide paths provided on the narrow sides of the cabinet, it calls for comparatively high constructional investment, because the twin guide paths provided on each cabinet side wall must be very precisely worked and shaped, respectivelly, in order to warrant a desirable uniform movement.

It is the object of the invention to provide a mechanical cabinet comprising a paternoster-like circulating conveyor of high stability of its own which warrants safe and non-tilting reception and guidance of the shelves regardless of their state of loading, and which, at the same time, requires comparatively less constructional investment.

According to the invention, this object is realized in that two vertically spaced guide elements are supported at each of the guide members rigidly mounted to the end walls of the shelves, and in the vertical sections of the guide rails the two guide elements are guided jointly, while in the arcuate sections of the guide rails only one of the guide elements is guided.

This embodiment of the mechanical cabinet according to the invention permits a substantial reduction of the production costs, as compared with embodiments of the same generic type, and warrants high overall stability, because during their vertical and arcuate circulating movement the shelves are positively guided and safeguarded against tilting and rocking movements in only a single circulating guide path. This safe guidance in the vertical paths of movement is achieved by the arrangement of the two guide elements—suitably designed as rollers—vertically spaced on the guide members which are rigidly connected to the supporting pins of the shelves. In vertical arrangement the guide elements run in the vertical sections of the guide rail and, owing to their spacing, prevent tilting motions of the shelves due to non-uniform loading and/or during start-up or slow-down of the circulating conveyor. When a shelf moves from one vertical path of movement to the other one, one of the guide elements gets out of the associated guide rail, and only the other guide element of each guide member is positively guided in the arcuate section of the guide rail. In these phases of movement a support safely avoiding tilting motions of the shelves in this critical region of the circular path is attained by a force supporting polygon which is formed by the guide element guided in the rail by way of the guide member and the shelf supporting pin rigidly connected to said member, and via the bolts of the endless chain engaging, on the one hand, the supporting pin and, on the other hand, two bolts of the endless chain engaged by the sprocket wheel. The arcuate guide rail for the second guide element in the upper and lower arcuate region which must be very precisely worked and which is subject to especially high mechanical stress is not necessary, which simplifies the manufacture, servicing and repair of the circulating conveyor of the invention.

If, according to a suitable embodiment of the invention, the pairs of spreading levers and supporting arms are arranged so that each lower supporting arm of a pair of supporting arms and each upper supporting arm of the next following pair of supporting arms are supported on the same chain bolt of the endless chain, safe and stable guidance in the center of gravity is achieved also in the notoriously especially critical sections shortly before and after a chain link supporting a supporting arm arrives at or leaves the respective sprocket. Also in this critical phase safeguarding of the individual shelves against tilting about the longitudinal axis thereof extending through the supporting bolts is warranted, although one guide element has already left the vertical section of the associated guide rail. With this arrangement of the supporting arm pairs the next following pair of supporting arms and the guide member thereof are responsible for safeguarding the shelf advancing into the transitional region against tilting motions while said member with both of its guide elements is still guided in the vertical section of the guide rail.

Suitably the two guide rails are mounted to strong frame members forming part of the warp-resistant supporting frame. The supporting pins of the shelves can be fixed to the respective inner side of the guide members by a weld, shrink or keyseat connection axially beside the support for the supporting arms. The guide elements in the form of rollers or sliding blocks are then arranged externally of the guide members such that the mutually parallel central axes of the supporting pin and of the upper roller are disposed in the same plane in all guide members.

According to a further suitable embodiment of the invention, the guide rail depth in the vertical sections is twice that in the arcuate sections, and the two guide elements of each guide member are so arranged at the guide member as to be mutually laterally offset by at least the simple depth of the arcuate sections due to differently long bearing pins. This embodiment offers the advantage that with the use of simple guide rails of U-shaped cross section a uniform transition from the vertical to the arcuate sections can be attained; it is only necessary to shorten, in the transitional sections, the two legs of the U-shaped cross section of the rails so much that one of the guide elements can smoothly leave the associated section of the guide rail.

Suitably the two guide elements are disposed in vertical and spaced-apart relationship at the respective guide member, and the lower guide element is guided in the vertical and in the arcuate sections of the guide rail, whereas the upper guide element leaves the associated guide rail in the arcuate section.

Regarding the manufacture of the guide members, and also the firm support and guidance of the shelves, one embodiment of the invention is particularly suitable in which the guide members are mounted in offset and mirror-reverse relationship to the two end walls of the shelves, and the two guide rails are laterally offset with respect to each other and to the center plane of the two endless chains by corresponding amounts. This embodiment permits the use of equally designed guide members with guide elements (rollers) for suspension of the shelves on both end faces, and avoids unstable positions of the shelves in the apex regions of the arcuate rail sections.

An operationally favorable further embodiment of the invention is characterized in that on their vertical path of travel the shelves can rest one on the other. Thereby the weight, for example, of a fully loaded shelf can be transferred at least partially to the supporting means of the next lower shelves so that peak loads on individual chain links and bearings are avoided. Moreover, the mutually supporting shelves quasi form a vertical column and thus contribute to the resistance of the entire cabinet construction to warping, particularly also during the start-up and slow-down phases. This opens up the possibility of high and optionally eccentric stress and loading of the individual shelves and reduces abrupt stress on the individual parts.

The invention further offers the possibility—advantageous regarding the investment costs and regarding service work—to use conventional plate link chains as endless conveyor means, and the chain bolts for supporting the respective supporting arms may also be normal chain bolts, e.g. of double chains. In order to permit smooth engagement of the chains as they run on and off the sprocket wheels, short sliding guides made of a suitable sliding material, e.g. plastic, can be mounted stationary in these regions to support and guide the rollers or sleeves of the chain.

After extended periods of operation the two endless chains inevitably undergo elongation which hitherto has been eliminated by manual operations, e.g. by displacing the drive shaft of the two sprockets, which required long working hours, and the driving accuracy and also the operational safety of the mechanical cabinet suffered from the gradually increasing slackness of the endless chains between servicing intervals. According to a suitable embodiment of the invention, an automatic tensioning device is provided for each endless chain which is permanently active and which maintains the chains under constant tension. At the same time at least one of the arcuate sections of each guide rail is connected longitudinally slidably to the two vertical sections and is movable in accordance with the tensioning movements of the endless chain. By mechanical coupling of the tensioning means with the arcuate section a synchronous movement of the sprocket wheel and of the arcuate section is achieved in a simple way.

If the endless chains or the connecting shaft of the two lower sprocket wheels are driven by a stationary electric motor, it is suitable to use a drive chain as transmission from the motor output shaft to the sprocket wheel shaft, and to provide a device for equalizing the tensioning movements of the two driven sprocket wheels of the two endless chains. The said device suitably comprises a tensioning wheel urging against the drive chain with a constant force independent of the tensioning movements of the respective sprocket wheel and locked against deflecting movements in the opposite direction.

In order to move selected shelves into the cabinet unloading position an electromechanical control with limit switches at each shelf is provided. Further limit switches also permit halting of a shelf in an intermediate position, which allows the use of shelves with intermediate decks, e.g. for storing small articles.

Hereafter examples of the invention will be described in detail with reference to the drawing wherein FIG. 1 diagrammatically shows an unencased mechanical cabinet with two endless chains and the shelves suspended thereon;

FIG. 2 shows a plate-shaped guide member with the shelf supporting pin and a portion of the pair of supporting arms connected thereto:

FIG. 3 is a diagrammatic view of the lower part of a guide path with a device for tensioning an endless chain;

FIG. 4 shows the cabinet part of FIG. 3 in section;

FIG. 5 is a diagrammatic view of the lower part of the cabinet with the device for tensioning the endless chains and a chain drive with equalizing means;

FIG. 6 shows the detail E in FIG. 5;

Figure 7:
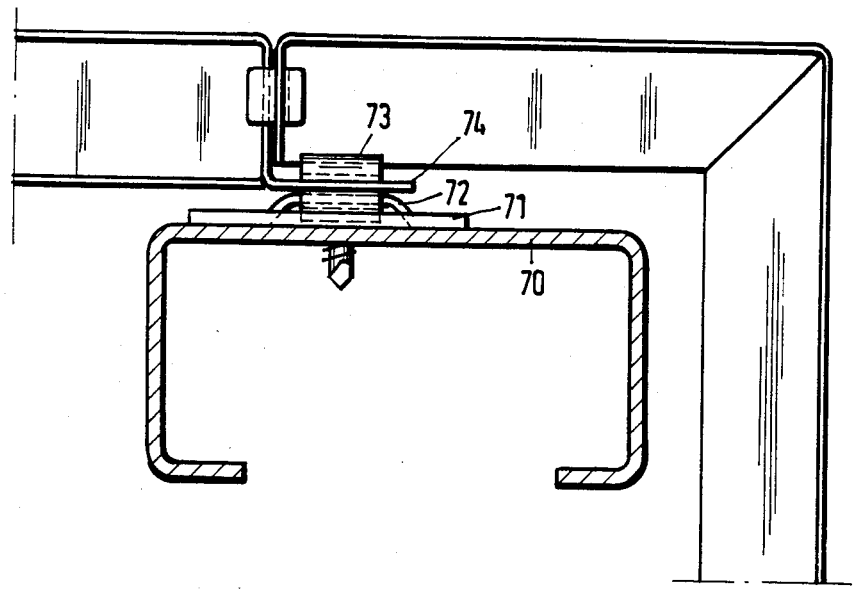
FIG. 7 illustrate, in section, the screwless mounting to 9 of panelling sheets.

In the illustration of a circulating conveyor for a mechanical cabinet shown in FIG. 1 the individual parts of the cabinet and the supporting frame for the circulating conveyor are not shown in the interest of clarity. It is merely pointed out that for easier assembly the individual side walls of the cabinet are adapted for disassembly, and a frame construction resistant to warping is provided for the cabinet walls in the bottom part of which the various drive means such as drive motor and transmission for the endless chains, control, etc. are accommodated.

As will be seen, the illustrated circulating conveyor comprises two endless chains 1, 2 each one of which runs over an upper and a lower sprocket wheel 3, 4 each. The vertical plane formed by the two shafts 5 of the upper and lower sprocket wheels defines the central plane of the mechanical cabinet.

At selected elongated bolts 6 of the endless chains supporting arms are supported for rotation so that two supporting arms 7, 8 each form a pair of supporting arms and are supported with their two free ends on a supporting pin 9.

From FIG. 2 it is apparent that each supporting arm 7 or 8, respectively, consists of two identical flat bars 7a, 7b and 8a, 8b, respectively, seated in axially spaced relationship on the supporting pin 9. This construction of the supporting arms offers relatively great stiffness and at the same time permits most simple manufacture of the supporting arms by punching. At the free end of each supporting bolt 9 a guide member 10 is mounted rigidly and secured against rotation, which may have the shape of a triangular, stiff metal plate, as shown in FIG. 2. At said plate-shaped guide member 10 two guide elements 11, 12 in the form of rollers are supported in vertically spaced arrangement on pins 13, 14 of different length; in the illustrated, especially suitable embodiment the central axes of the supporting pin 9 and of the bearing pin 13 of the upper roller 11 extend in a horizontal plane indicated by the connecting line 15. It is apparent that the lower roller 12 is axially offset by at least the width of the upper roller 11 by the use of an accordingly longer bearing pin 14.

Each supporting pin 9 is fixed non-rotatively to an end wall 16 of a dimensionally rigid shelf 17. Each shelf thus has at its end wall 16 one guide member 10 with rollers 11, 12 as guide elements which is rigidly connected thereto via the supporting pin 9. The guide elements 11, 12 of each end face are guided each in a closed guide path 18 and 19, respectively, consisting each of two vertical sections 20 and an upper and lower arcuate connecting section 21 and 22, respectively. In the vertical sections 20 of the guide rails 18 and 19, respectively, which suitably have U-shaped profile, the two guide elements 11, 12 of the respective shelves are guided. To this end the guide rails in said sections have a depth corresponding to the offset arrangement of the guide elements 11, 12. At the end of each vertical section the depth of the guide rails abruptly changes so much that the depth in the arcuate sections 21 und 22, respectively, is reduced to an amount sufficient for guiding the lower roller 12 of each guide member 10, while the upper roller 11 leaves the guide rail and describes an arcuate path of a different configuration without being guided. In order to warrant smooth entry and exit of the upper rollers 11 into and out of the associated vertical sections of the guide rails, entry and exit arcs 24, respectively, are formed at the end and at the beginning of said vertical sections 20.

From FIG. 1 it is apparent that the two guide rails 18, 19 forming closed loops are mutually laterally offset by equal amounts with respect to the vertical plane extending through the central axis 5. As a consequence, the guide members 10 running in the guide rail 18 point to the right with their tips receiving the supporting bolt 9, whereas the guide members running in the looped guide rail 19 point to the left with their tips receiving the corresponding supporting bolts. All the guide members 10 consequently can be equally designed, the guide members at one end wall of the shelves being offset by 180° in mirror-reverse position relative to the guide members at the other end wall of the shelves. This lateral offsetting ensures stable support of the shelves also when they pass through the apex regions of the arcuate rail sections 21, 22, as is illusstrated in FIG. 1 for the topmost shelf. The figure shows that the lower roller 12 of said shelf is positioned precisely at the upper apex of the arcuate guide path 21 of the guide rail 18.

When the guide member 10 of a shelf end face passes through the critical apex region of the arcuate guide path 20 it could happen that the shelf 17 slightly rocks or tilts, if it were not for the mutual offsetting of the guide rails and mirror-reverse arrangement of the guide members. However, this is prevented by the offset arrangement of the second guide rail 19 in the rear of FIG. 1, because then also the corresponding supporting or guide point for the rear roller 12 is offset relative to that of the front roller 12, and in this way a multipoint support of the shelf is provided. Since thus at any instant at least one of the two guide members is in a stable guiding position, the shelf 17, even if eccentrically loaded, can be safely moved through the dead center region of each guide member.

In order to warrant smooth and uniform movement of the endless chains 1, 2 designed as standard plate link chains onto and off the sprocket wheels 3, 4,slide guides 25 are fixedly mounted in these regions which may be made, for example, of a suitable plastic material such as PVC.

By the use, according to the invention, of only a single looped guide rail 18 and 19, respectively, on each side and of the stepped depth of the guide rails in the transition from the vertical to the arcuate sections, the position of said transition and of the respective entries and exits 24 of the guide rails is so adapted to the size of the supporting arms 7, 8 and of the guide members 10 that the individual shelves are guided stably and without vibration also at the instant when the upper roller 11 just leaves its vertical guide rail 20. This state is illustrated for the uppermost shelf 17a of the shelves directly vertically supporting each other whose uppermost supporting arm 7a with its chain bolt has already moved onto the upper sprocket wheel 3 and whose upper roller 11a has already left the vertical section 20 of the guide rail 18. In this and in a directly following state the shelf 17a is nontiltably guided and supported by the lower roller 12a which is still guided in the arcuate section 21 by the plate-shaped guide member 10a, by the supporting arm 7a, and by the lower supporting arm 8a. Deflecting motions of the chain in the origin of force of the lower supporting arm 8a are prevented in that the upper supporting arm 7b of the next following pair of supporting arms is supported by way of the supporting pin 9b and the guide member 10a whose two guide elements 11b and 12b are guided in the vertical section of the guide rail. This transmission of the supporting forces to adjacent supporting arm pairs avoids undesirable tilting motions of the shelves and stress buildup particularly in the region of the various joints and the chain plate links.

Moreover, according to the invention the individual shelves are so designed that—as illustrated on the left hand side of FIG. 1—when moving along their vertical paths of advance they directly support one another so that the supporting forces acting on the endless chains compensate each other.

As will be seen from FIGS. 3, 4, each of the two sprocket wheels 4 connected for co-rotation by the shaft 5 is supported in a thrust piece 30 guided on both sides for vertical sliding motion along guide rails 33, 34 fixed to posts 31, 32. The lower end of a spindle 35 guided in a threaded sleeve 37 fixed to a frame support 36 urges against the top side of the thrust piece 30. As shown especially in FIG. 4, the upper end of the spindle 35 is connected by a transverse pin 38 to a tube 39 for co-rotation therewith. A torsion spring 40 wound about said tube 39 and the upper portion of the spindle 35 is fixed with its lower end to the crosspiece 36 and with its upper end to the tube 39. The torsion spring 40 has sufficient length of about 50 to 90 cm and exerts on the spindle a rotary force in screw-in direction the magnitude of which is about constant, no matter how far the spindle 35 is screwed into the threaded sleeve 37 and regardless of the level of the thrust piece 30, respectively. To the lower end of the thrust piece 30 a connecting rod 41 is linked which engages the lower arcuate section 22 of the guide path 19 approximetely in the apex region. Said arcuate section 22 is vertically slidably guided by way of a pin 42 in an elongate opening 43 in the post 32. The two ends of the arcuate path section 22 are connected via one slide means 44, 45 each to the lower ends of the vertical guide path sections 20 so as to be longitudinally slidable. In order to permit smooth movement of the rollers 11, 12 into and out of the arcuate section 22 even if the latter has been shifted vertically downwardly by certain amounts, meshing tabs and recesses 46, 47 are provided in the slide means 44, 45 which, even in extended position, form a flat run way for the rollers owing to their meshing engagement.

FIG. 5 schematically illustrates the drive of the one sprocket 4 by means of an electric motor 50 mounted to the cabinet housing via a chain drive 51. An endless chain 52 is trained over a sprocket 53 co-rotatively seated on the shaft 5 and over a drive wheel 54 seated on the motor output shaft 55. In order to compensate for vertical shifting of the shaft 5 and to maintain the tension of the endless chain 52 constant, a device is provided which consists of a pivoted lever 56 with a freely supported tensioning wheel 57 at its free end, and of a source of power 58. Said source of power contains a bar 59 linked to the lever 56 and extending through a clamping lock 60 and surrounded by a coil spring 61 in the portion between the lever 56 and the clamping lock 60. As is apparent from FIG. 6, the clamping lock 60 mounted to a frame member has an opening 62 whose one end face 63 extends obliquely outwardly imparting to said opening 62 a wedge-shaped configuration. In the lower, narrowest region the width of the opening corresponds approximately to the diameter of the bar 59. Owing to the illustrated oblique position of said bar 59 and to the described configuration of the opening 62 there is clamping action between the lock 60 and the bar 59 preventing the latter from sliding in upward direction. Since the coil spring 61 is seated, on the one hand, at the clamping lock 60 and, on the other hand, at the lever 56, it exerts continuous compressive force on the lever 56 and thereby urges the wheel 57 against the endless chain 52 with a predetermined and substantially constant force.

After the mechanical cabinet has been in operation for an extended period of time the two endless chains 1, 2 inevitably are subject to elongation, which is within the range of several centimeters for cabinet heights up to 6 meters. This elongation is automatically compensated by the above described measures and does not call for any special servicing work. Upon each revolution of the possibly partially loaded shelves there briefly occurs a state in which the entire load of the shelves is received by the two upper sprockets 3 in symmetrical distribution over the endless chains. In said state the lower sprocket 4 is freed from the weight of the shelves. The tensioning device of the invention makes use of this circumstance. The torsion spring 40 exerts a constant rotary force on the spindle 35 seeking to screw it into the threaded sleeve 37. As soon as the sprocket 4 or the connecting shaft 5 and the respective thrust piece 30 are free from stress, this rotary force acting on the spindle 35 is sufficient to slightly screw it further into the threaded sleeve 37 and thereby to slightly shift the thrust piece 30 downwardly until any elongation of the endless chain 1, 2 has been compensated and it has regained its original tension. In order to maintain the optimum guide spacing between the sprockets and the guide members 10 and their rollers 12, respectively, the lower arcuate sections 22 of the guide paths 18,19 are vertically slidably connected to the straight sections 20 by way of the means 44, 45. Simultaneously with the tensioning movement of the endless chains 1, 2, i.e. with the vertical shifting motion of the thrust pieces 30, a shifting motion of the lower arcuate sections takes place 22, namely by mechanical coupling of said arcuate sections 22 with the thrust piece 30 by way of the connecting rod 41. This guides the arcuate section 22 via the pin 42 in the elongate opening 43 in the post 32.

The above described equalizing motion of the lower sprockets 4 results in a corresponding change of the relative position between the two sprocket wheels 53 and 54. In order to maintain the drive chain 52 under the required constant tension, the spring-loaded device 58 engages the lever 56 and urges its tensioning wheel 57 with a predetermined force against the upper run of the drive chain 52. Since the shelves are always moved into the loading and unloading position on the shortest path, the electric motor 50 operates in one or the other direction of rotation, as required. In order to prevent the chain 52 from urging the tensioning wheel 57 away when the conveyor circulates in the direction indicated by the arrow P, whereby the chain tension would be lost, the clamping device 58 shown in enlarged scale in FIG. 6 as "detail E" is provided which prevents upward movement of the lever 56 and of the bar 59.

Figure 8:
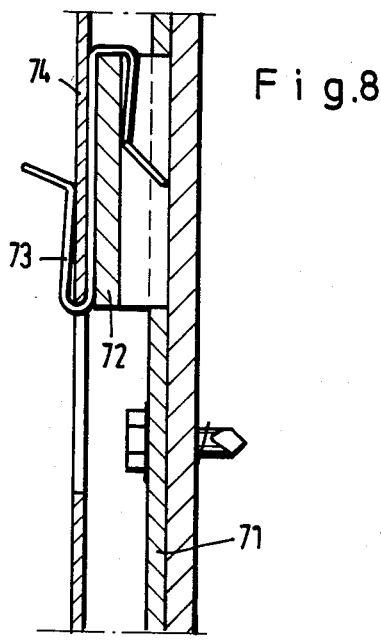
Figure 9:
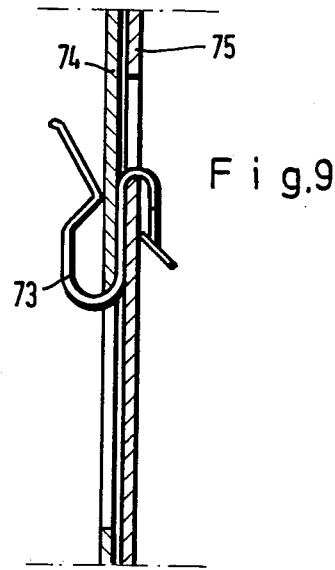

FIGS. 7 to 9 show a possibilty how to fasten the sheet metal panelling of the mechanical cabinet in the most simple manner without the use of screws. On suitable posts or crossbars of the frame structure, e.g. at the post 70, sheets 71 are mounted which have tongues 72 extending therefrom. Into the openings defined by the tongues 72 spring clips 73 of about S-shaped configuration are inserted with one leg thereof, while into the other leg a panelling sheet 74 is hooked. These spring clips 73 may have the configuration shown in FIGS. 8 and 9, respectively. FIG. 9 shows a possibility of detachably connecting two sheets 74, 75 directly with such spring clips 73.

Figure 10:
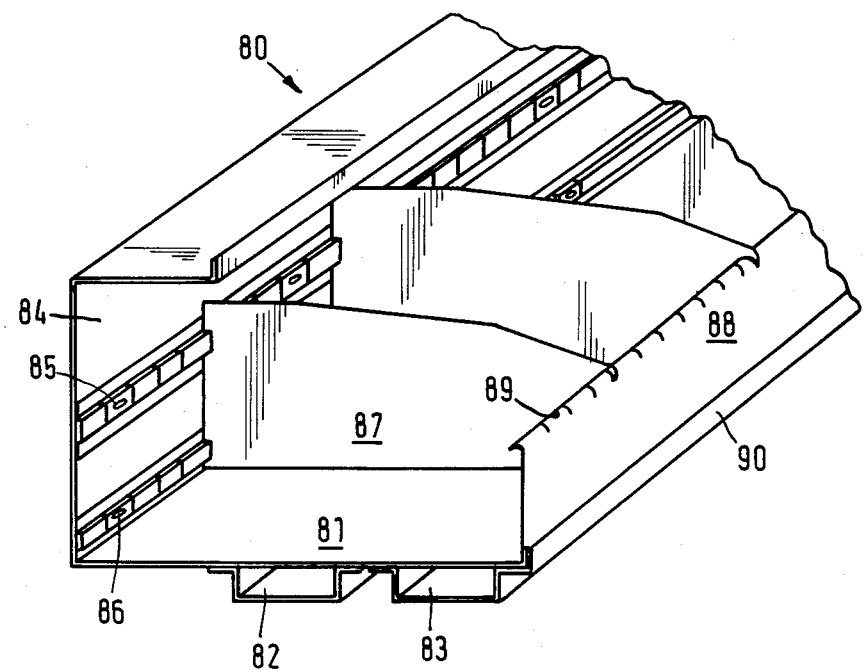
FIG. 10 shows part of a shelf in perspective view.

The shelf 80 illustrated in FIG. 10 consists of a planar bottom 81 to the underside of which two stiffening bars 82, 83 are rigidly connected. To the back wall 84 two rows of slotted holders 85, 86 are fastened in the slots of which transverse walls 87 can be inserted with their rear edges. The front end wall 88 of the shelf has the shape of a bar with bent upper end 89 provided with slots. The front wall 88 can be inserted with its lower edge into a rabbet formed by bending an end strip 90. This embodiment offers the possibility of converting the shelves, which are open on the front side, as shown in FIG. 1, to so-called trough shelves with lateral compartments. To this end it is only necessary to insert the front wall 88 into the end strip 90 and to insert the partition walls 87 into the respective slots from above, said partition walls 87 serving at the same time to support the hingedly inserted end wall 88 and help to stiffen the entire shelf. In order to attain direct support of the individual shelves on each other in the region of the vertical guide paths 20, the end walls on the narrow sides of the shelves are made sufficiently stiff to permit positive support of the bottom bars 82, 83, said positive engagement avoiding lateral horizontal movement of the individual shelves resting one on the other.

The invention is not restricted to the illustrated and described example. This particularly applies to the embodiment of the tensioning device. Thus, for instance, the spindle adjustment 35, 37 in combination with the torsion spring 40 can be replaced by other mechanical, pneumatic and/or electrical adjusting devices, e.g. by gas-filled springs. The same applies to the device 56, 58 affecting the drive chain 52.

The above described mechanical cabinet is provided with a program control permitting, by means of a keyboard, the selection of individual shelves in a freely selectable sequence, which then are moved sequentially into the unloading or loading position on the shortest way. To this end actuating members, e.g. toes or pins, are mounted to each shelf which actuate limit switches provided at the frame in predetermined positions. It has proved to be suitable to provide additional limit switches in intermediate positions in order to be able to halt the respective shelves also in intermediate planes. In this case shelves having several decks can be employed the interior of which is divided, for example, by horizontal decks or drawers. This multiplies the space available for orderly storage of different articles without complicating or inconveniencing the charging and discharging thereof. If said additional limit switches can be shifted in position, it is possible to precisely adapt them to the individual needs of the respective user.

An essential criterion for practical use of mechanical cabinets resides in the so-called maximum admissible unbalance. Said unbalance automatically results from nonuniform loading of the individual shelves and becomes extremely high when, for example, the shelves shown on the left-hand side in FIG. 1 are filled completely or partially, while the shelves on the right-hand side—not shown in FIG. 1 for reasons of clarity—are empty. In such a case the entire load would rest solely on the left-hand run of the two endless chains 1, 2 and would produce a tilting moment which impairs the stability of a cabinet of a height up to 6 meters or more. In order to avoid such tilting hazards, or to indicate to the user that the unbalance has exceeded predetermined limits, and that for this reason he must take care of more uniform loading, the mechanical cabinet of the invention is provided with an optical or acoustical warning device. The device makes use of the observation that the momentarily existing unbalance directly influences the power input of the drive motor. Consequently, an electric monitoring circuit with a time lag element and an optical or acoustical alarm is connected to the circuit of the drive motor 50; said monitoring circuit ignores the brief high starting currents but responds to abnormal power input caused by excessive unbalance. Said monitoring circuit suitably includes a switch which shuts down the drive motor and thus inactivates the entire mechanical cabinet if and when the admissble unbalance is exceeded by a predetermined amount, e.g. by 10 or 20%.

We claim:

1. A mechanical cabinet including a circulating conveyor comprising:
    two vertically disposed and synchronously driven endless chains, a multiplicity of shelves pivotably affixed with their end walls to the two endless chains, at predetermined equal distances, by way of pairs of supporting arms attached to chain bolts on said endless chains, and
    stationary endless guide rails secured to narrow sides of the cabinet, each guide rail consisting of two vertical sections and one upper and one lower arcuate section, all of said sections having parallel guide surfaces, guide members rigidly mounted to the end walls by supporting pins and disposed for guided movement by said parallel guide surfaces, a pair of guide elements mounted on each guide member, said guide elements separated from each other by a vertical distance and offset laterally with respect to each other and jointly guided in the vertical section of said guide rails,
    said upper and lower arcuate sections having a "U"-shaped profile having a width to accommodate the guide element which is remotely mounted from the guide member,
    said vertical sections having a "U"-shaped profile having a width to accommodate both of the laterally offset guide elements,
    means for attaching one arm of one shelf and the arm of an adjoining shelf to the same chain bolt of the endless chain, and
    an automatic tensioning device cooperatively associated with each endless chain to apply tension to said chain, said tensioning device including means for slidably supporting at least one of said arcuate sections in each guide rail with respect to the respective vertical section for responding to tensioning movements.

2. A mechanical cabinet according to claim 1, characterized in that central axes of the supporting pin and of the upper guide element are parallel to one another and are disposed in the same horizontal plane.

3. A mechanical cabinet according to claim 1 or 2, characterized in that the vertical sections are twice as deep as the arcuate sections, and that the two guide elements are supported by the guide member by means of pins having different lengths, so that the guide elements are laterally mutually offset by at least the depth of the arcuate section.

4. A mechanical cabinet according to claim 1, characterized in that the lower guide element of each guide member is guided in the arcuate sections.

5. A mechanical cabinet according to claim 1, characterized in that the guide members are disposed at the two end walls of the shelves in mutually mirror-reverse relationship, and that the two guide rails are laterally offset with respect to each other.

6. A mechanical cabinet according to claim 5, characterized in that the shelves rest on one another during their vertical path of movement.

7. A mechanical cabinet according to claim 1, characterized in that each supporting arm of the pairs of supporting arms consists of two flat bars.

8. A mechanical cabinet according to claim 1, wherein each chain is supported by a pair of spaced sprockets, each supported by shafts journaled in support members, each tensioning device includes a frame support, a pair of spaced posts supporting said frame support, one of said arcuate sections slidably secured to one of said posts, and a tensioning member cooperatively disposed between said frame support and a central portion of said arcuate section for applying tension to one of said sprockets, to obtain simultaneous movements of said sprocket and said arcuate section.

9. Mechanical cabinet according to claim 8, wherein the tensioning device simultaneously affects the sprockets of the endless chain and the longitudinally slidable arcuate section in the respective guide rail.

10. Mechanical cabinet according to claim 8, wherein the tensioning device comprises a spindle constantly maintained under a torsional force and engaging with one end a vertically guided thrust piece which is linked via a connecting rod to the longitudinally slidable arcuate section of the guide rail.

11. Mechanical cabinet according to claim 8, wherein the arcuate section of the guide rails is connected by way of sliding blocks to the vertical sections of the guide path to provide a continuous guiding surface.

* * * * *